US008391838B2

(12) United States Patent
Vered

(10) Patent No.: US 8,391,838 B2
(45) Date of Patent: Mar. 5, 2013

(54) SECURE MOBILE COMMUNICATION SYSTEM AND METHOD

(75) Inventor: Moshe M. Vered, Kiryat-Ono (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/195,142

(22) Filed: Aug. 1, 2011

(65) Prior Publication Data

US 2013/0035062 A1 Feb. 7, 2013

(51) Int. Cl.
*H04M 1/66* (2006.01)
*G06F 11/00* (2006.01)

(52) U.S. Cl. ............ 455/410; 455/411; 726/22; 726/23; 726/24; 726/26

(58) Field of Classification Search ................... 455/410
See application file for complete search history.

(56) References Cited

U.S. PATENT DOCUMENTS

2010/0173607 A1* 7/2010 Thornton et al. ............. 455/410

* cited by examiner

*Primary Examiner* — Huy C Ho
(74) *Attorney, Agent, or Firm* — Roach Brown McCarthy & Gruber, P.C.; Kevin D. McCarthy

(57) ABSTRACT

A security level indicator for a mobile communication device is adapted to alert a user of a device when the weighed combination of security-related parameters reaches a predefined level.

12 Claims, 5 Drawing Sheets

SECURE MOBILE COMMUNICATION SYSTEM AND METHOD

FIELD OF THE INVENTION

The present invention relates to the field of secure mobile communications.

BACKGROUND OF THE INVENTION

Today's networks are becoming very vulnerable to privacy issues and security. Mobile phones that continuously change cells connect to several networks at one time. Also, mobile phones nowadays contain many assets and private information, such as the current position of its owner and his historical locations. In this complex climate the user has no indication of the "security status" of the phone he uses, while he is well aware, for instance of the transmission level. For example, if the RF reception level is low, the user knows it thanks to a simple meter indication shown on the screen. Therefore, the user understands the quality of the line, and with a low reception level will try to improve reception by moving to a different location. Yet, when it comes to security, the user has no perception of the current security level of the phone.

Mobile phones are much more mobile than laptops and therefore their security level may change rapidly. While some solutions have been provided, e.g., for Microsoft Windows users, to alert of security risks, for instance, when browsing the web, there are no known solutions to the problem described for mobile. The art has provided firewalls and anti-viruses, and even encrypted storage for mobile, but none provide feedback for the user with respect to phone call security. For instance, a mobile phone user does not know how an unknown GSM cell affects the security of the call, or how a downloaded application having "CALL" or "RECORD" permissions affects the security of the call.

All the problems detailed above, as well as the solutions provided hereinafter, are applicable to cellular telephony as well as to web-based telephony calls done over data lines (e.g., VOIP, such as Google voice or Skype).

SUMMARY OF THE INVENTION

In one aspect the invention relates to a security level indicator for a mobile communication device, which is adapted to alert a user of a device when the weighed combination of security-related parameters reaches a predefined level. In one embodiment of the invention the predefined level of the indicator is selected from at least three levels, comprising high, medium and low security level.

In an embodiment of the invention the security-related parameters are weighed by assigning to them a weight [0-1] and a normalized scale from [0-1] and then determining the security level SL as follows:

$$0 \leq SL = \sum_{i=1}^{n} w_i Si \leq 1$$

$$\sum_{i=1}^{n} w_i = 1$$

Of course, alternative weighing methods can be devised by the skilled person, and any such alternative method does not exceed the scope of the invention.

In another aspect the invention relates to a method for providing a security level indication to a user of a mobile communication device, comprising providing a weighed combination of security-related parameters and alerting the user when such weighed combination reaches a predefined level. As said, the predefined level can be composed of a plurality of sub-levels, and in one embodiment of the invention it is selected from at least three levels, comprising high, medium and low security level. Of course, narrower intervals can be provided, for example, such as "Very high", "High", "Medium", "Low" and "Very low", as the selection of the intervals can be easily made by the skilled person, depending on the intended use or other considerations.

The invention also encompasses a mobile communication device comprising a Security Level Indicator.

DETAILED DESCRIPTION OF THE INVENTION

Figure 1:
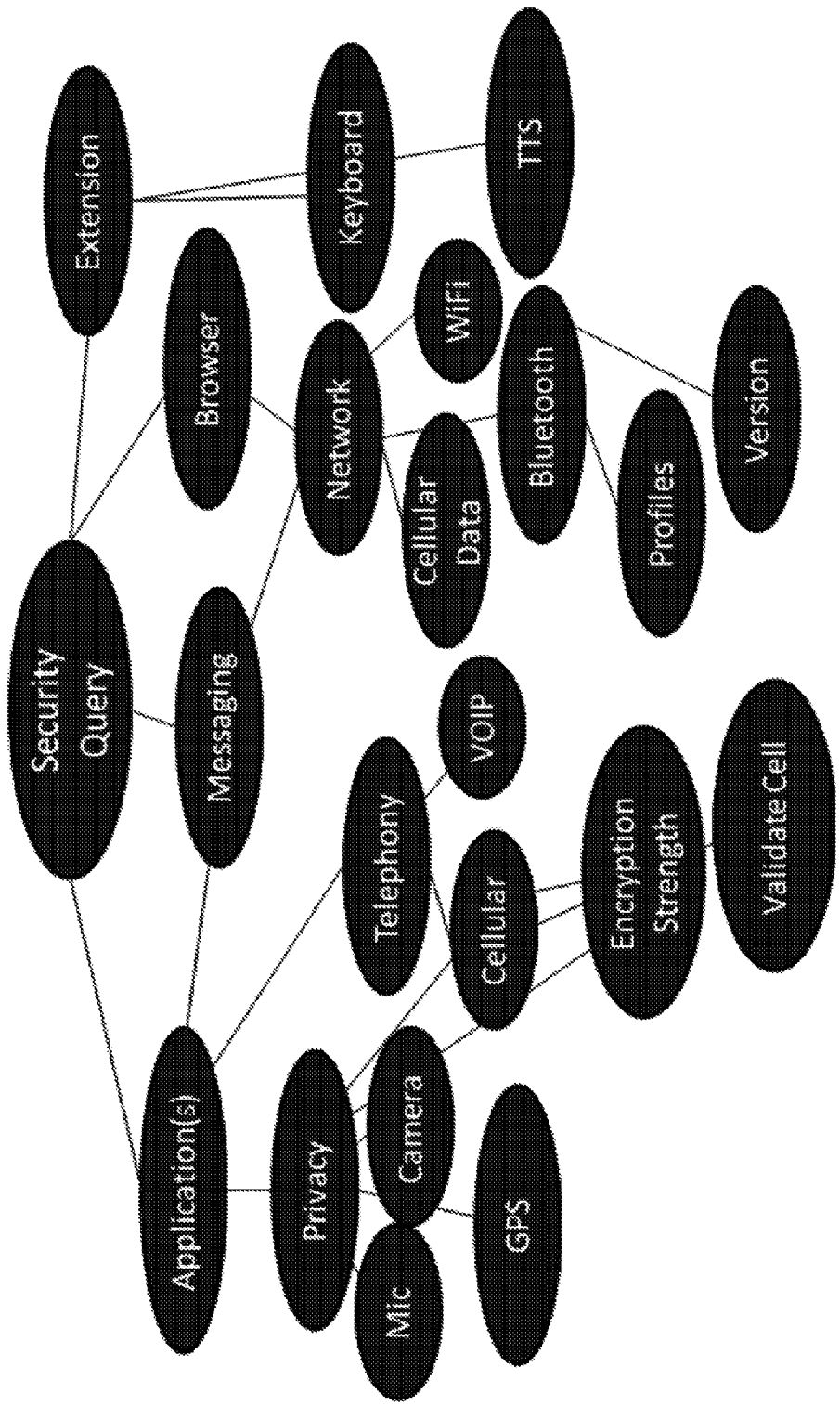
FIG. 1 schematically illustrates a Hierarchical Security Query.

The invention provides a Security Feedback Indication to user, and quickly allows the user to decide whether to proceed with his call, or to postpone it or to take other action to attain a better security level. The invention is useful not only for making secure calls within a secure environment, but can be also used for data sensitive activities, such as those performed by a financial terminal. The invention should not be confused with devices and methods such as those described in US Patent Application 2006/0090200, which use a communication controller which acquires identification information of another device by communicating with the other device.

In one illustrative embodiment of the invention the security level comprises 3 major defined levels (high, medium, low) and 1 customized level, which allows additional personalization. Of course, this setup is arbitrary and any other division of security levels can be used, if desired. Each level is a representation of an approximation function of many security parameters within the system. The user receives an indication of the security level under which the device operates and is therefore able to make a choice of how to behave, based on this indication. Thus, if the security level is unsatisfactory, the user can end the call, or move to a different location. Security level can also undergo degradation during phone call, and according to one embodiment of the invention the user is alerted, for instance using an audio signal (e.g., a beep) into the user's audio output, thus alerting him even if a graphical interface is not visible under the current user's conditions (e.g., if the mobile phone is pressed to his ear).

On the other hand, if the security condition is rendered unsatisfactory due to the operation of a specific application (e.g., a location application) the user has the option to block the location application temporarily, while continuing the phone call. In one embodiment of the invention the user further has the option to pre-program the security alert system to block other applications automatically or whether to block applications on an Ad-Hoc basis.

In the exemplary embodiment of the invention three major modes are provided:

Automatic, where everything is done to keep the security level as high as possible;

Indicative—which gives the user an indication that the security level has worsened or improved;

Ask—which prompts the user to decide whether he wishes to continue the conversation under the existing conditions.

The following is a partial illustrative list of activities, which can be regarded as sensitive to SL (Security Level):

Phone calls—incoming/outgoing to specific contacts, or in general

Web sites that are sensitive—company management site, or bank account management;

Email account/billing account;

Calls from sensitive location (e.g., board meeting room);

Sensitive activities (e.g., board meeting).

In order to maintain a high security level the user receives security indications before and during phone calls. Some illustrative examples of parameters that are taken into account for risk assessment are as follows:

the GSM mode (encryption type if any, 3g/2g)

Microphone, camera on indication.

WiFi: can allow only secure WiFi (depending on the type of security used for WiFi a better "grade" can be assigned—for example WPA is more secure than WEP).

Fine Location is disclosed to the public? (namely, allowing applications to publish the user's current location continuously).

Bluetooth on:

Bluetooth discoverability on?

Which types of Bluetooth profiles are used? (FTP, AV, SPP, etc.)

Which type of Bluetooth stack is used?

Which version of Bluetooth is supported?

Is the phone rooted? (namely has it been jailbroken, or the user can get root permissions. For example in iOS the user cannot get root permissions, unless the phone is jailbroken).

Anti-key-logging (use only official virtual keyboard) when using sensitive applications such as banking.

Policy definition (change definition of security level).

Are third-party accessibility tools used? (i.e. external Text-to Speech systems (TTS), external virtual keyboard, etc.)

Verified GSM cell? (does the cell belongs to an authorized operator?)

The current version of the device firmware, which can be more elaborated and, for instance, may consist of a list of module versions (modem, system, middleware). For example: some versions of GSM modem firmware are more vulnerable than newer patched versions. Knowing the modem version will allow to predict the risk level.

Downloaded (as opposed to pre-installed/trusted) application(s) running concurrently, which can potentially increase the risk when dealing with sensitive use-cases. For example if a third-party application is used, which backups the phone regularly to an untrusted cloud storage. This can lead to data leakage.

Each parameter is assigned a weight [0-1] and a normalized scale from [0-1] and then the security level SL is determined as follows:

$$0 \leq SL = \sum_{i=1}^{n} w_i Si \leq 1$$

$$\sum_{i=1}^{n} w_i = 1$$

Where n is the number of groups of permissions. The number of elements used to approximate security can change and is not limited by the above examples.

The Security Level (SL) of this illustrative embodiment of the invention is defined with 3 pre-defined levels (High, Medium, Normal). The weights change as each element may change its risk along the lifetime of the product, where in some cases there could be improvement or degradation of elements within the system. For example, if a newly-discovered modem vulnerability is published, then the cellular risk increases, but if a patch was applied, the risk remains the same or even decreases. The weights (w), the scales(s) and the different levels can be updated and adjusted remotely.

The predefined weights are based on the current risks involved with each module/application version (i.e. browser version, modem version, kernel version, etc.)

For example, let us assume that the SL is defined as follows:

High: SL$\leq$0.9

Medium: 0.5$\leq$SL<0.9

Low: SL<0.5

Table I details illustrative Sample Scales (Si) and weights ($w_1$i) for a "Sensitive outgoing Phone call", while Security Level is "Low".

TABLE I

| Parameter | Range | Scale | Normalized Scale | Weight | Weighted Normalized Scale |
|---|---|---|---|---|---|
| GSM encryption mode | 0-10 | 2 | 0.2 | 0.25 | 0.05 |
| Microphone on | 0-1 | 0 | 0 | 0.025 | 0 |
| Camera on | 0-1 | 0 | 0 | 0.025 | 0 |
| WiFi: can enforce only secure WiFi | 0-10 | 0 | 0 | 0.1 | 0 |
| Fine Location is disclosed to public? | 0-4 | 1 | 0.25 | 0.1 | 0.025 |
| Bluetooth discoverability on? | 0-5 | 1 | 0.2 | 0.025 | 0.005 |
| Which types of Bluetooth profiles are used? | 0-5 | 1 | 0.2 | 0.025 | 0.005 |
| Which type of Bluetooth stack is used? | 0-5 | 1 | 0.2 | 0.025 | 0.005 |
| Which version of Bluetooth is supported? | 0-10 | 6 | 0.6 | 0.025 | 0.015 |

TABLE I-continued

| Parameter | Range | Scale | Normalized Scale | Weight | Weighted Normalized Scale |
|---|---|---|---|---|---|
| Is the phone rooted? | 0-1 | 0 | 0 | 0.1 | 0 |
| Anti-keylogging | 0-4 | 1 | 0.25 | 0 | 0 |
| Are third-party accessibility tools are used? | 0-10 | 2 | 0.2 | 0.1 | 0.02 |
| Verified GSM cell? | 0-10 | 2 | 0.2 | 0.1 | 0.02 |
| Version of the firmware? | 0-10 | 9 | 0.9 | 0.05 | 0.045 |
| Downloaded application(s) running? | 0-10 | 10 | 1 | 0.05 | 0.05 |
| Total SL | | | | 1 | 0.24 |

Table II details illustrative Sample Scales (Si) and weights ($w_\perp i$) for a "Sensitive outgoing Phone call", while Security Level is "Medium":

TABLE II

| Parameter | Range | Scale | Normalized Scale | Weight | Weighted Normalized Scale |
|---|---|---|---|---|---|
| GSM encryption mode | 0-10 | 9 | 0.9 | 0.25 | 0.225 |
| Microphone on | 0-1 | 0 | 0 | 0.025 | 0 |
| Camera on | 0-1 | 0 | 0 | 0.025 | 0 |
| WiFi: can enforce only secure WiFi | 0-10 | 1 | 0.1 | 0.1 | 0.01 |
| Fine Location is disclosed to public? | 0-4 | 1 | 0.25 | 0.1 | 0.025 |
| Bluetooth discoverability on? | 0-5 | 1 | 0.2 | 0.025 | 0.005 |
| Which types of Bluetooth profiles are used? | 0-5 | 1 | 0.2 | 0.025 | 0.005 |
| Which type of Bluetooth stack is used? | 0-5 | 1 | 0.2 | 0.025 | 0.005 |
| Which version of Bluetooth is supported? | 0-10 | 6 | 0.6 | 0.025 | 0.015 |
| Is the phone rooted? | 0-1 | 0 | 0 | 0.1 | 0 |
| Anti-keylogging | 0-4 | 1 | 0.25 | 0 | 0 |
| Are third-party accessibility tools used? | 0-10 | 2 | 0.2 | 0.1 | 0.02 |
| Verified GSM cell? | 0-10 | 2 | 0.2 | 0.1 | 0.02 |
| Version of the firmware? | 0-10 | 9 | 0.9 | 0.05 | 0.045 |
| Downloaded application(s) running? | 0-10 | 10 | 1 | 0.05 | 0.05 |
| Total SL | | | | 1 | 0.425 |

Table III details illustrative Sample Scales (Si) and weights ($w_\perp i$) for a "Sensitive outgoing Phone call", while Security Level is "High":

TABLE III

| Parameter | Range | Scale | Normalized Scale | Weight | Weighted Normalized Scale |
|---|---|---|---|---|---|
| GSM encryption mode | 0-10 | 9 | 0.9 | 0.25 | 0.225 |
| Microphone on | 0-1 | 0 | 0 | 0.025 | 0 |
| Camera on | 0-1 | 0 | 0 | 0.025 | 0 |
| WiFi: can enforce only secure WiFi | 0-10 | 9 | 0.9 | 0.1 | 0.09 |
| Fine Location is disclosed to public? | 0-4 | 1 | 0.25 | 0.1 | 0.025 |
| Bluetooth discoverability on? | 0-5 | 1 | 0.2 | 0.025 | 0.005 |
| Which types of Bluetooth profiles are used? | 0-5 | 1 | 0.2 | 0.025 | 0.005 |
| Which type of Bluetooth stack is used? | 0-5 | 1 | 0.2 | 0.025 | 0.005 |
| Which version of Bluetooth is supported? | 0-10 | 6 | 0.6 | 0.025 | 0.015 |
| Is the phone rooted? | 0-1 | 0 | 0 | 0.1 | 0 |

TABLE III-continued

| Parameter | Range | Scale | Normalized Scale | Weight | Weighted Normalized Scale |
|---|---|---|---|---|---|
| Anti-keylogging | 0-4 | 1 | 0.25 | 0 | 0 |
| Are third-party accessibility tools used? | 0-10 | 9 | 0.9 | 0.1 | 0.09 |
| Verified GSM cell? | 0-10 | 9 | 0.9 | 0.1 | 0.09 |
| Version of the firmware? | 0-10 | 9 | 0.9 | 0.05 | 0.045 |
| Downloaded application(s) running? | 0-10 | 10 | 1 | 0.05 | 0.05 |
| Total SL | | | | 1 | 0.645 |

When applying a new security policy within existing applications and operating systems, compatibility issues may exist, which may result in a decline in usability and functionality. In an embodiment of the invention in order to prevent incompatibility to the user, the user can be prompted to ignore security levels for a limited period of time, or amount of usage, if a need arises to overcome such incompatibilities.

The main focus of this method of quantitizing the risk of the system, is looking on the type of action or usage within a changing (mobile) security climate, taken by the user, rather than a specific application permission management as seen in PCs, in personal firewalls, which allow or block resources of a specific application. What actually happens in the case of a personal firewall as seen on end-user PCs is that, the novice user is asked questions, or blocked, where it is not always clear what should be allowed in order to do a task, such as browsing the internet.

The security query that is passed in order to calculate the security level according to the invention, is done periodically, or can be event driven (e.g. by a change of location can be considered to be "an event") and hierarchically as shown. For instance, let's look at a situation in which the SL is already high because of the Network (e.g., connection via WiFi) and an application that has permission to record and has connectivity to the network is running. Let us assume that their combined value is within the normal SL, which means that it can be worsened by a finer Security Query. Namely, because of the hierarchical nature, once a "leaf" has a high value, the other siblings are not queried. This allows making an approximation of risk without the need for a full query of the system, which may take longer and use up resources (battery).

This is an important capability, since mobile phones have limited resources, and need to have quick user-responsiveness.

Figure 2:
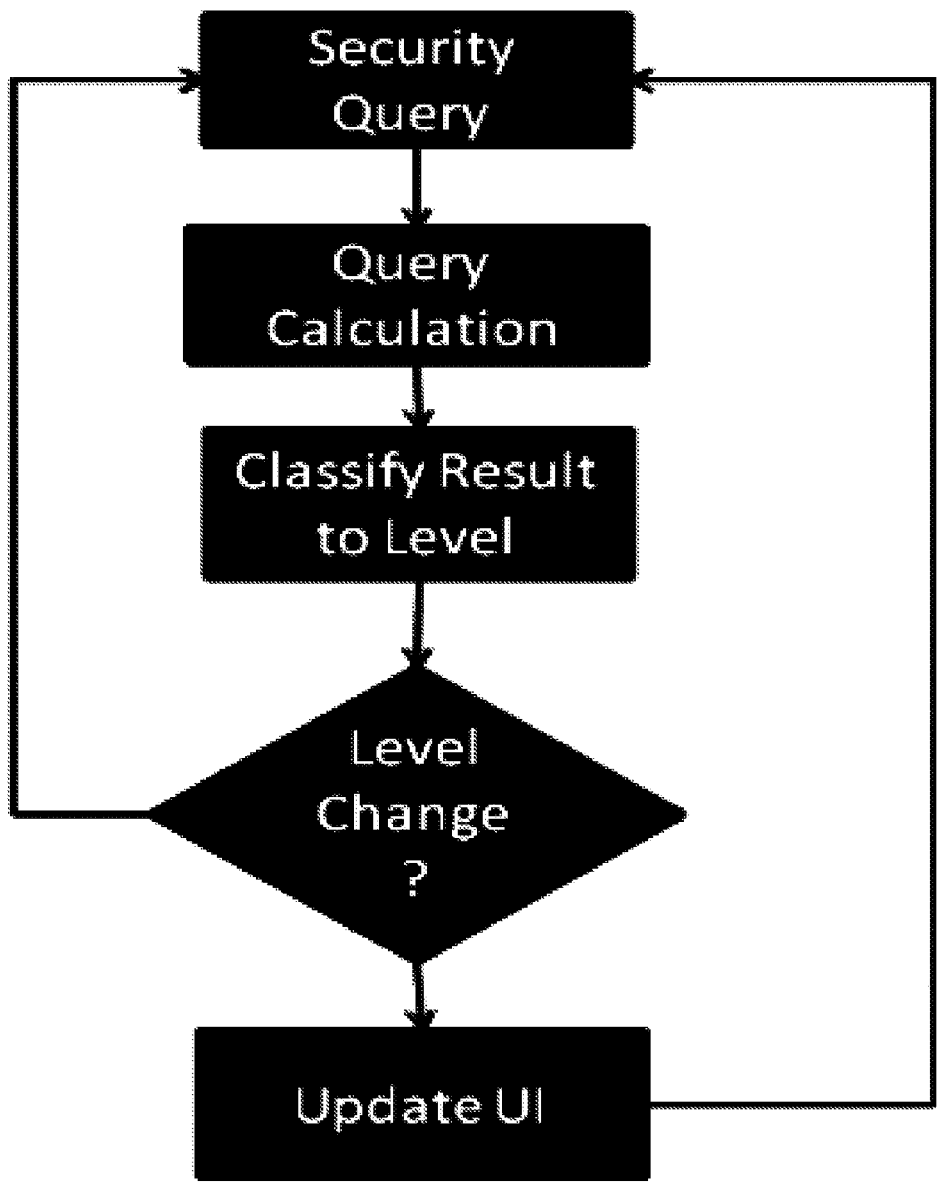
FIG. 2 schematically shows an On-going Security Query.

The iterative nature of the security query is schematically illustrated in FIGS. 1 and 2. FIG. 2 explains the general method of periodically checking if the security risk has changed enough to notify the user. It is generally desirable to prevent too many indications, which increases its distractive effect to the user, which in turn may decrease its effectiveness. FIG. 1 details how an exemplary Security Query is carried out, how each module is dependant from other resources (e.g. a browser needs a network, which means that a browser is exposed to the network), and, for example, how having a risk existing within the network affects all native network applications.

EXAMPLES

Figure 3A:
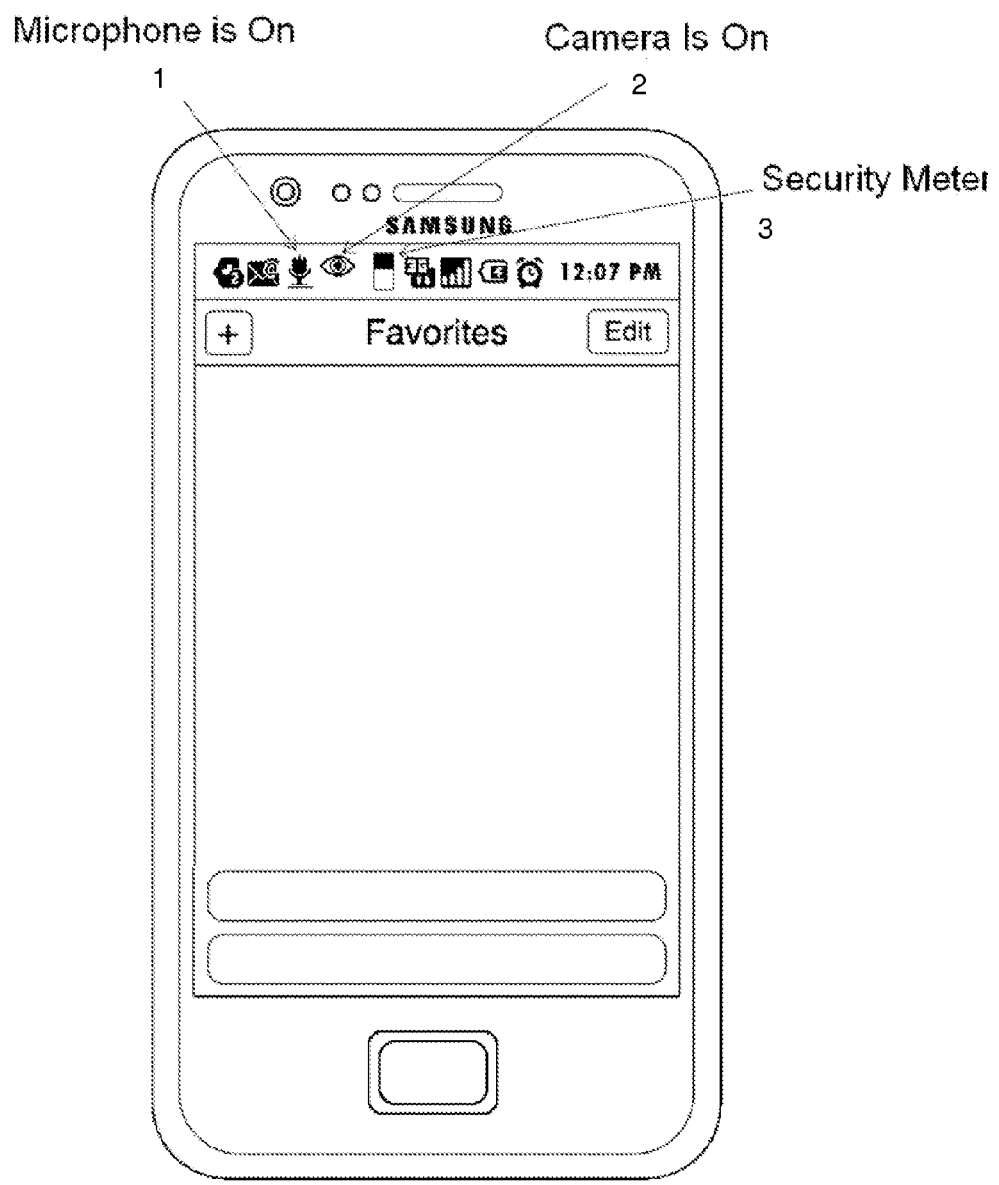
FIG. 3 (A through D) illustrates the use of a Security Meter on a mobile phone.

Some illustrative examples will now be given, with reference to FIG. 3A, which is a schematic illustration of a mobile phone provided, inter alia, with a security level indicator 3 (the "Security Meter"), a camera indicator 2 and a microphone indicator 1.

The following examples use actions done by the user, for illustration purposes, but as the skilled person will appreciate they are relevant also for non-user actions, such as a state, for example a sensitive meeting, where no application, having "RECORD" or "CALL" on the phone should be run, without explicit user approval. An illustrative scenario is the following: The user is about to join a sensitive business meeting (that may be spied on). The user will make sure that the meeting is protected from eavesdropping of any kind.

Example 1

Calling CEO of MyToy: Sensitive Call, Regarding End of Year Reports

The contact card of CEO of MyToy, is classified in a Sensitive contact group, thus alarming the user when the security level of Security Meter is "Low".

Since the Security mode for this example is "Ask", the user is asked the following question: "Do you wish to continue, or improve security?"

The user sees that the Security Meter is "Low" and presses a button to receive information on how to improve the SL, which information includes:
  Stop all running applications that are not fully trusted use the native dialer (the phone's calling application);
  Change location (suspecting an unknown cell, possibly malicious, giving the nearest possible locations on a map);
  Enforce only 3g networks (no fallback option), no roaming;
  Stop all privacy-exposing applications (Gmail, Facebook, browser).

Figure 3B:
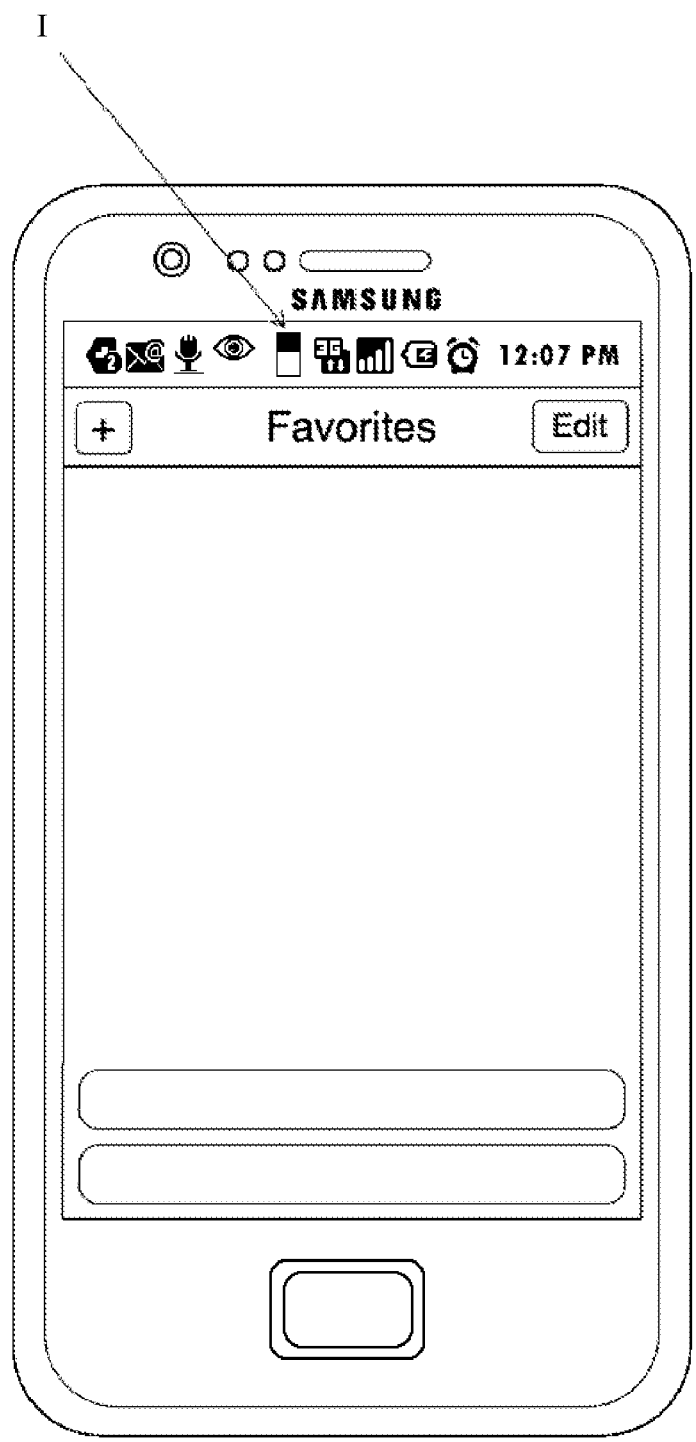
Figures 3C, 3D:
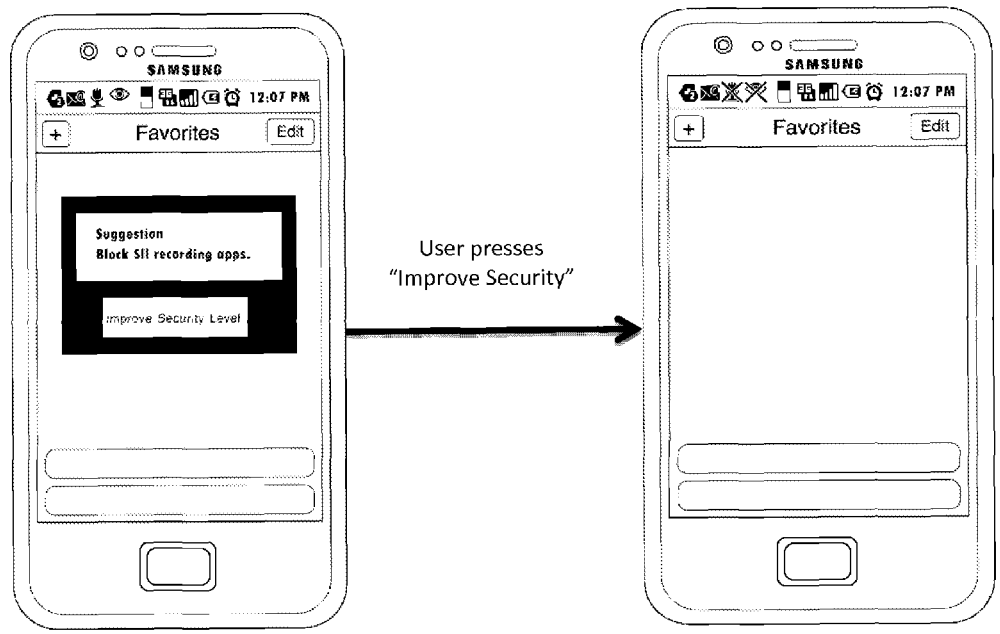

The user has a low security level (FIG. 3B) and presses "improve" in the screenshot shown in FIG. 3C, thus transitioning to the state of FIG. 3D, as indicated by the arrow, and the Security Meter turns to "Medium", then the user moves to a better location, and the Security Meter turns to "High". Now the user initiates the call, and no alarm is given by the system.

If during the call the user has driven and changed cell, and the new cell is not recognized as trusted, the user receives an audio signal (several beeps) which indicate that the security level has changed.

Example 2

Making Sensitive Phone Call Using Skype to CFO

The contact card of CFO, is classified in a Sensitive contact group, thus alarming the user when the security level of the Security Meter is "Low". The calling method is Skype, and data is routed via WiFi and not by GSM. The security level reflects the security level of the data channel (i.e., if the WiFi is encrypted, if it is a public vs. private.)

Since the Security mode is "Ask", the user is a question: "Do you wish to continue, or improve security?" The user sees that the Security Meter is "Low" and presses a button to receive information as to how to improve the SL. The following information is received:

Stop all running applications that are not fully trusted use the native dialer (the phone's calling application);

Change location (suspecting an unknown cell, possibly malicious, giving the nearest possible locations on a map);

Enforce only highly secured WiFi;

Stop all privacy exposing applications (Gmail, Facebook, browser.)

The user presses "improve" as explained above with reference to Example 1 and FIG. 3, and the Security Meter turns to "Medium", then moves to a better location, and the Security Meter turn to "High". Now the user initiates the call, and no alarm is given.

If during the call the user has driven and changed cell, and the new cell is not recognized as trusted, the user receives an audio signal (several beeps) which indicate that the security level has changed.

Example 3

Making a Financial Transaction from Bank Account

Connecting to the Z-Bank web site is considered a Sensitive Action. The phone is in "Automatic" mode, thus when accessing a bank account via the web site, all applications are blocked, no location disclosure is allowed (no GPS can be turned on), only the pre-installed keyboard is operational, and no accessibility applications are turned on, or can be used to enter a user name and password.

The user finishes using the bank account, exits the browser and the phone reverts back to normal mode.

As will be apparent to the skilled person the invention provides the user with a tool that allows him to be aware of his mobile phone's security level, which is not available in the prior art. The above examples have been provided for the purpose of illustration and are not intended to limit the invention in any way. As will be apparent to the skilled person, the invention is not limited to any particular mode of execution and can be implemented in any suitable be that will provide a security level indication to a mobile user.

The invention claimed is:

1. A security alert system, which is operable to assign a predetermined weight and normalized scale to each of a plurality of security-related parameters related to applications or modules running on a mobile communication device, to determine an instantaneous security level for said device based on a combination of said weighted and scaled parameters, and to alert a user of said device when said instantaneous security level reaches a predefined level;

wherein the security-related parameters are weighed by assigning to them a weight from [0-1] and a normalized scale from [0-1] and then determining the security level as follows:

$$0 \le SL = \sum_{i=1}^{n} w_i S_i \le 1$$

$$\sum_{i=1}^{n} w_i = 1$$

where SL is the security level, w is the weight, S is the normalized scale, n is the total number of parameters, and i is the ith parameter.

2. The alert system according to claim 1, wherein the predefined level is selected from at least three levels, including a high, medium and low security level.

3. A method for providing a continuous security level indication to a user of a mobile communication device, comprising the steps of:

(a) assigning a predetermined weight and normalized scale to each of a plurality of security-related parameters related to applications or modules running on said device;

(b) determining an instantaneous security level for said device based on a combination of said weighted and scaled parameters;

(c) continuously indicating said instantaneous security level; and (d) alerting a user of said device when such instantaneous security level reaches a predefined level;

wherein the security-related parameters are weighed by assigning to them a weight from [0-1] and a normalized scale from [0-1] and then determining the security level as follows:

$$0 \le SL = \sum_{i=1}^{n} w_i S_i \le 1$$

$$\sum_{i=1}^{n} w_i = 1$$

where SL is the security level, w is the weight, S is the normalized scale, n is the total number of parameters, and i is the ith parameter.

4. The method according to claim 3, wherein the predefined level is selected from at least three levels, including a high, medium and low security level.

5. The method according to claim 3, wherein the user of the mobile device, after being alerted, relocates in order to reduce the instantaneous security level.

6. The method according to claim 3, wherein the user of the mobile device, after being alerted, terminates the running application or module in order to reduce the instantaneous security level.

7. The method according to claim 3, wherein the user of the mobile device, after being alerted, terminates a phone call in order to reduce the instantaneous security level.

8. A mobile communication device, comprising a security monitoring system for assigning a predetermined weight and normalized scale to each of a plurality of security-related parameters related to applications or modules running on said device, and for determining an instantaneous security level for said device based on a combination of said weighted and scaled parameters, wherein said device is configured with a continuously operating Security Level Indicator for indicating said determined instantaneous security level;

wherein the security-related parameters are weighed by assigning to them a weight from [0-1] and a normalized scale from [0-1] and then determining the security level as follows:

$$0 \le SL = \sum_{i=1}^{n} w_i Si \le 1$$

$$\sum_{i=1}^{n} w_i = 1$$

where SL is the security level, w is the weight, S is the normalized scale, n is the total number of parameters, and i is the ith parameter.

9. The mobile communication device according to claim 8, wherein the security monitoring system is also operable to alert a user of the device when the instantaneous security level reaches a predefined level.

10. The mobile communication device according to claim 8, which is operable in an automatic mode by automatically interfacing with the running applications or modules in such a way so as to maximize the instantaneous security level.

11. The mobile communication device according to claim 8, wherein the Security Level Indicator also provides an indication that the instantaneous security level has recently worsened or improved.

12. The mobile communication device according to claim 9, which is operable in an ask mode whereby a window is displayable after the instantaneous security level has reached the predefined level, to question the user whether the device should be relocated or whether one or more of the running applications or modules should be terminated in order to reduce the instantaneous security level.

* * * * *